United States Patent [19]

Dessenoix et al.

[11] 4,450,853

[45] May 29, 1984

[54] ASSEMBLY FOR DRAWING OFF A LIQUID BY MEANS OF A GAS UNDER PRESSURE

[76] Inventors: Robert Dessenoix, 11, Chennevières St.; Pierre Dessenoix, 2, Veluché Rd., both of 79600 Airvault, France

[21] Appl. No.: 285,525

[22] Filed: Jul. 21, 1981

[51] Int. Cl.³ .............................................. F16L 39/00

[52] U.S. Cl. .................................. 137/212; 222/400.7

[58] Field of Search ...................... 137/212; 222/400.7

[56] References Cited

U.S. PATENT DOCUMENTS 3,687,340 8/1929 DeLaHunt .
4,180,189 12/1979 Zurit .............................. 137/212 X

FOREIGN PATENT DOCUMENTS 1468211 2/1967 France .
1508333 1/1968 France .
1586478 2/1970 France .
1239908 7/1971 United Kingdom ................ 137/212
1256427 12/1971 United Kingdom ................ 137/212
1512641 6/1978 United Kingdom .

*Primary Examiner*—Alan Cohan
*Attorney, Agent, or Firm*—Cushman, Darby & Cushman

[57] ABSTRACT

The invention relates to an assembly for drawing off a liquid by means of a gas under pressure. A head comprises a central sliding tube, controlled by a cam, and a ring defining, due to an O-ring, a tight annular chamber when the tube is raised. A plunger tube is surrounded by a sleeve which raises the valve after the end of the central sliding tube has been brought into tight abutment on a flexible sleeve.

3 Claims, 2 Drawing Figures

ASSEMBLY FOR DRAWING OFF A LIQUID BY MEANS OF A GAS UNDER PRESSURE

BACKGROUND OF THE PRESENT INVENTION

The invention relates to an assembly for drawing off a liquid by means of a gas under pressure.

French Pat. Nos. 1 508 333, 1 468 211 and 1 586 478 in particular disclose heads for drawing off liquid such as beer, which simultaneously place the container under gaseous pressure and draw off the liquid. Precautions are taken to avoid the gas expanding outside the connection of the liquid pipe. However, these known devices are applicable only to plunger tubes provided with stop cocks whose opening is controlled by the connection of the draw off head. The drawback of this is that the storage containers must be provided with plunger tubes with spring mechanisms which therefore require careful maintenance. In addition, these known devices are provided with springs, the breakage of which may be the cause of poor functioning and may be detrimental to the safety of use thereof.

It is an object of the invention to propose an improved draw-off assembly which may be connected to a plunger tube not provided with a cock and therefore excluding, from that point of view, any malfunction liable to affect operational safety. It is a further object of the invention to improve operational safety of the head itself and to simplify manufacture thereof.

SUMMARY

These objects are attained, according to the invention, by a draw-off assembly comprising a head for drawing off a liquid by means of a gas under pressure, adapted to be connected to a plunger tube sealably traversing the wall of a recipient storing this liquid, comprising a body, in which may slide a mobile central tube, of which the lower end may be sealably connected to the plunger tube by controlled descent with respect to the body, said body comprising a gas inlet pipe in an annular space made between the mobile central tube, the body itself and a lower annular valve disposed between the body and the mobile central tube, said valve being adapted to be raised by contact with an element for connection to the plunger tube, wherein the annular valve is slidably mounted between the body and the mobile central tube and is adapted to come into positive contact with the element for connection to the plunger tube.

In this way the gas pressure, if it is applied in the annular chamber, causes the valve to close as long as there is no positive, upwardly actuating contact, i.e., as long as the head is not connected and the mobile central tube is not lowered into sealed contact with the plunger tube. The drawback of deformable seals and the malfunctions that they may provoke, particularly by ageing and fatigue, is thus eliminated.

According to a preferred embodiment, the annular valve is slidably mounted between the body and the central tube against the force of the gas and/or of a spring abutting on the mobile central tube or a member longitudinally displaceable with the mobile central tube. In this way, the valve remains in closed position, even if the gas pressure is not applied but, if the spring breaks, the pressure of the gas will immediately tend to close the valve if the connection with the plunger tube is not impeccable, this advantage having already been mentioned. In addition, said spring is sufficient to ensure return of the mobile central tube when it is unlocked from its position of connection.

As is known per se, it is advantageous if the controlled descent of the mobile central tube is directed by a helicoidal cam provided on the body. Manoeuvre is thereby more supple and less hard.

The upper end of the plunger tube is, according to the invention, surrounded by a piece for connection of the body bearing a fixed stop for axially retaining the annular valve and a flexible sleeve sealably cooperating with the front face of the mobile central tube stands in the annular space between the plunger tube and the tight connecting piece.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
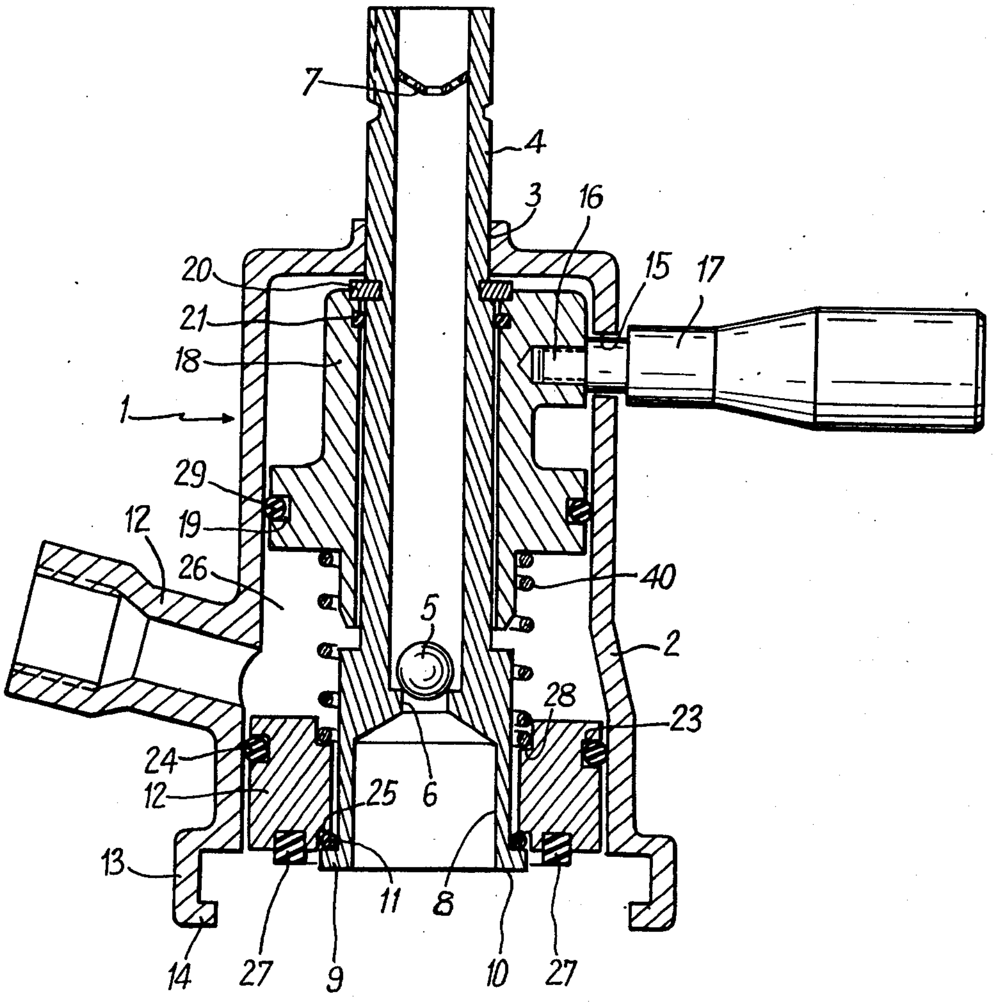
FIG. 1 is a view in axial section of a beer draw-off head according to the invention.

Referring now to the drawings, the actual draw-off head will firstly be described. The head I comprises a body 2 generally in the form of a partially cylindrical bell comprising an axial slide bearing 3 for a mobile central tube 4 containing a ball 5 forming a beer check valve on a constriction 6 constituting seat for the ball. A grid 7 for upwardly stopping the ball is provided. The lower end 8 of the tube 4 terminates in a flange 9 serving on the one hand as front stop 10 for connection to a plunger tube connection and, on the other hand, as bearing surface for an O-ring 11 fitted on the tube 4. The body 2 comprises a gas inlet connection 12 near its lower part and a skirt 13 with bayonet or internal flange 14 notched to grip an assembly flange, as will be set forth. The body 2 further comprises a helicoidal groove 15 in its upper cylindrical part to guide the rod 16 of a lever 17 for controlling a piston 18 which may hermetically move in the cylindrical part of the body, due to an O-ring 29 disposed in a groove 19. The piston 18 is connected to the mobile central tube 4 by a connecting ring 20 completed by an O-ring 21. In this way, any manoeuvre of the lever 17 drives, as desired the mobile central tube 4 upwards or downwards, where it may be locked by an upper catch in the helicoidal groove 15.

On the lower part of the mobile central tube 4 is mounted, with clearance, a ring 22 comprising an outer circular groove 23 for an O-ring 24 against the cylindrical lower wall of the body 2 in its lower part below the level where the gas inlet connection 12 opens. The ring 22 is provided, in its lower inner part, with an inner circular bevel 25 adapted to bear on the O-ring 11 retained by the flange 9. The ring 22 bears in its upper part another inner circular bevel 28 serving as stop for a spring 40 surrounding the tube 4 and abutting, on the other hand, on the piston 18.

It will be observed from the foregoing that, if a gas pressure is applied in the connection 12, this pressure is applied to an annular chamber 26 defined by the mobile central tube 4, the body 2 and the ring 22 which constitutes valve bearing on the O-ring 11. Due to the other O-rings 29, 24 and 21, the annular chamber 26 is perfectly tight whatever the height of adjustment of the mobile central tube within the limits allowed by the helicoidal ramp 15 which correspond substantially to the height of the cylindrical part of the body 2 on which the O-ring 24 bears. The ring 22 further bears on its front face an O-ring 27 which cooperates with the connection 30 which will be described hereinafter.

To receive the draw-off head 1, a connection 30 is provided, which is generally in the form of a sleeve 35 screwable in the wall 31 of a keg or like container for a plunger tube 32. The connection 30 is provided in its upper part with a flange 33 sealably fitting in the lower part of the body 2 bearing the skirt 13 and possibly notched if the skirt 13 is of the bayonet type. The base of the sleeve 35, on the side which is introduced into the container, is provided with peripheral vents 39 and bears a plate 34 provided with vents 41 and centrally traversed by the plunger tube 32 with which it is fast and which rises substantially up to the flange 33. A truncated sleeve 36 with flat upper front surface 38 rises from the plate 34 in the annular space between the sleeve 35 and the tube 32, said truncated sleeve tightening on the tube 32 in its upper part up to its top edge which comprises a series of vents 37 provided for the upward flow of the beer. The truncated sleeve 36 is made of relatively supple material, for example a thermoplastics resin, which may flex from the position shown in broken lines 36' to the position shown in solid lines 36 under a mechanical thrust, without, however, losing close contact with a piece which pushes downwardly.

Figure 2:
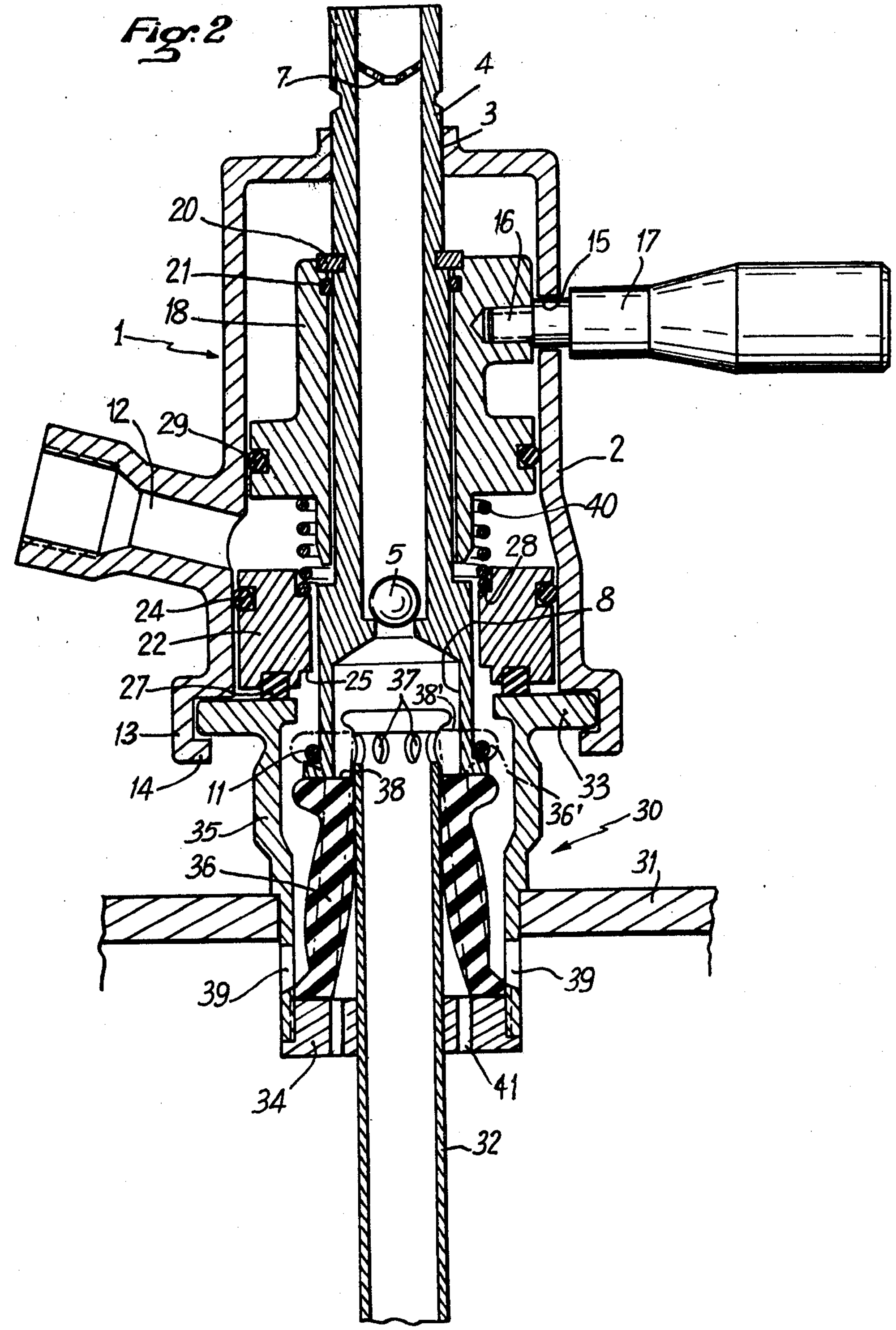
FIG. 2 is a view in axial section of the same draw-off head in position of connection on a plunger tube installed on a container and constituting a draw-off assembly according to the invention.

To connect the head 1, the body 2 and the flange 33 are connected, as shown in FIG. 2, then the mobile central tube 4 is lowered against the force of the spring 40, the front stop 10 of said central tube 4 coming into contact with the sleeve 36, then in position 36', and the O-ring 27 abutting on the flange 33. As soon as contact is established between front stop 10 and sleeve 38 (then at 38') and between O-ring 27 and flange 33, continuity and seal are ensured between the plunger tube 32 and the mobile central tube 4 and between the body 2 and the flange 33. If the mobile central tube 4 continues to be lowered, the sleeve 36 bends, it clears the vents 37 so that the ring 22 forming valve pressed by the spring 40 is retained and is left by the O-ring 11 taken by the tube 4 which descends. From this instants, the gas, possibly introduced into the annular chamber 26, finds a free passage between the ring 22 and the tube 4 and the pressure is transmitted to the container via the annular space between the sleeves 35 and 36 and the vents 39. No release of gas and no outward projection of liquid are possible as long as the pipes for the gas and for the liquid are not in strictly tight continuity and the beer, or like liquid, flows safely each time it is drawn-off.

Inversely, it is impossible to remove the head without the gas inlet and liquid outlet being previously closed.

We claim:

1. In a draw-off assembly comprising a head for drawing off a liquid by means of a gas under pressure, adapted to be connected to a plunger tube assembly sealably traversing the wall of a container for storing safe liquid, comprising a body, in which is slidable a mobile member including a mobile central tube and a piston, said mobile central tube having a lower end which is adapted to be sealably connected to the plunger tube by controlled descent with respect to the body, said body comprising a gas inlet pipe leading to an annular space made between the mobile central tube, the body itself and a lower annular valve wherein said lower annular valve is mounted between the body and the mobile central tube for sliding freely inside said body and outside said mobile central tube, said annular valve having a front sealing ring and being urged toward a lower end of said body, said body having a coupling means for connection with a flange of said plunger tube assembly whereby said front sealing ring is in sealing contact with said flange when said coupling means is connected with said flange independently of the said mobile central tube in said body, said lower annular valve being urged by a spring abutting on said mobile member constituted by said mobile central tube and said piston.

2. The draw-off head of claim 1 wherein said piston is mounted for sliding freely and hermetically inside the body, said piston being connected hermetically to the mobile central tube and connected with a lever through a helicoidal groove in the wall of said body, the lower annular valve being urged by the spring abutting on said piston.

3. The draw-off head of claim 1 wherein the lower end of the mobile central tube has a flange with an O-ring fitted on said tube and said lower annular valve is urged against said O-ring when said mobile central tube is at its upwards position.

* * * * *